United States Patent
Ji

(10) Patent No.: US 9,119,417 B1
(45) Date of Patent: Sep. 1, 2015

(54) SAFFLOWER SEED BEVERAGE

(71) Applicant: Yoonaa Ji, Garden Grove, CA (US)

(72) Inventor: Yoonaa Ji, Garden Grove, CA (US)

( * ) Notice: Subject to any disclaimer, the term of this patent is extended or adjusted under 35 U.S.C. 154(b) by 0 days.

(21) Appl. No.: 14/455,751

(22) Filed: Aug. 8, 2014

(51) Int. Cl.
*A23L 1/025* (2006.01)
*A23L 2/38* (2006.01)
*A23L 2/52* (2006.01)

(52) U.S. Cl.
CPC ... *A23L 2/38* (2013.01); *A23L 2/52* (2013.01); *A23V 2002/00* (2013.01)

(58) Field of Classification Search
CPC ........... A23L 2/38; A23L 2/52; A23L 1/2128; A23L 1/368; A23V 2002/00
USPC .................................. 426/629, 598, 615, 507
See application file for complete search history.

(56) References Cited

U.S. PATENT DOCUMENTS 7,695,744 B1 * 4/2010 Kareem .................... 424/776
2007/0286938 A1 * 12/2007 Saiki et al. ................. 426/597
2014/0170287 A1 * 6/2014 Kahsai ...................... 426/548

OTHER PUBLICATIONS

Cole, C. Nut Milks, Woodridge Press, Santa Barbara, CA 93160, 1990, pp. 85, 113.*

* cited by examiner

*Primary Examiner* — Helen F Heggestad
(74) *Attorney, Agent, or Firm* — East West Law Group; Heedong Chae

(57) ABSTRACT

The safflower seed beverage contains a safflower seed extract, a black sesame extract, at least one flavoring ingredient, and water. The safflower seed beverage is made by placing a mixture of safflower seeds, black sesame seeds, the at least one flavoring ingredient, and the water into a juicer and running the juicer to extract from the mixture the safflower seed beverage in a form of a drinkable stable emulsion. The black sesame seeds are in an amount of about 75 to 180% by weight of the safflower seeds and the carrots are in an amount of about 2,100 to 2,500% by weight of the safflower seeds. In addition, the water is in an amount of about 50 to 250% by weight of the safflower seeds.

4 Claims, No Drawings

SAFFLOWER SEED BEVERAGE

FIELD OF THE INVENTION

The present invention relates in general to a safflower seed beverage, and more specifically, to a safflower seed beverage for a dietary supplement and the method to manufacture the same such that the safflower seed beverage only contains natural ingredients of safflower seeds, black sesame seeds, carrot and water.

BACKGROUND OF THE INVENTION

Safflower seeds have been found to have surprising medicinal activity against cancers, bone fractures, and osteoporosis because of the organic platinum, calcium, phosphorus and other nutrients in safflower seeds. In addition, safflower seeds are known to help in maintaining good health, losing weight, improving heart health, and maintaining healthy skin and hair.

One study suggests that daily consumption of safflower seeds is good for bone health and another study suggests that Korean safflower (*Carthamus tinctorius* L) seed oil has medicinal effect on treating osteoporosis.

In addition, safflower seed oil extracted from safflower seed is known to contain phytosterols, saturated fat, monounsaturated fat, polyunsaturated fat, omega-6 fatty acids, vitamin E (Alpha Tocopherol), vitamin K and choline. Because of high amounts of polyunsaturated fats in safflower seed oil, it helps in the proper functioning of the body, eliminating the excess fat accumulated in the body, and reducing the level of cholesterol in the blood, and thus, many doctors recommend safflower oil to obese people. Furthermore, vitamin E of safflower oil promotes hair growth and a healthy skin.

There are two processes for extracting the safflower seed oil from the safflower seed, the chemical process and the mechanical process. The chemical process involves addition of certain chemicals into safflower seed to extract out the oil and refine it. During this chemical process, essential nutrients in the safflower seeds are eliminated and contaminated with harmful chemicals. The other method of extracting oil from the safflower seeds is the mechanical method which takes out the oil from the seed by expelling method or cold pressing method. The expelling method with an efficient mechanical press increases the oil yield from safflower seed; however, the friction and pressure of the machine can cause temperature to rise in high temperature, and results in the loss of volatile nutrition of safflower seeds. Contrarily, the cold pressing process allows the separation of safflower seed oil from the safflower seed at low temperature which helps in retaining all the beneficial natural ingredients from safflower seed. However, the extraction rate of the cold-press method is low resulting in increased cost to manufacture especially for small scale producers.

Despite its nutritional and medicinal benefits, consumption of the safflower seed oil is not pleasant because of its thick texture and oily taste. To overcome this problem, artificial ingredients such as flavors are added to the extract of safflower seeds, but artificial ingredients are known to cause a number of health problems. Moreover, the consumption of raw safflower seed oil which has high concentration of saturated and unsaturated fats may results in digestive problems for consumers having weak digestive system.

Therefore, to solve the above problems, a need for a safflower seed beverage made from high efficiency cold-presser for a dietary supplement having a good taste and easy digestion has been present for a long time considering the expansive demands in the everyday life. This invention is directed to solve these problems and satisfy the long-felt need.

SUMMARY OF THE INVENTION

The present invention contrives to solve the disadvantages of the prior art. The present invention provides a safflower seed beverage and the method to manufacture the same.

The object of the invention is to provide a safflower seed beverage which contains a safflower seed extract, a black sesame extract, at least one flavoring ingredient, and water. The safflower seed beverage is made by placing a mixture of safflower seeds, black sesame seeds, the at least one flavoring ingredient, and the water into a juicer and running the juicer to extract from the mixture the safflower seed beverage in a form of a drinkable stable emulsion.

Another object of the invention is to provide a safflower seed beverage which consists of a safflower seed extract, a black sesame extract, a carrot extract, and water. A juicer is used to produce the extracts respectively from safflower seeds, black sesame seeds, and carrots. The black sesame seeds are in an amount of about 75 to 180% by weight of the safflower seeds and the carrots are in an amount of about 2,100 to 2,500% by weight of the safflower seeds. In addition, the water is in an amount of about 50 to 250% by weight of the safflower seeds.

Still another object of the invention is to provide the method to manufacture the safflower seed beverage, including the steps of preparing a mixture of safflower seeds, black sesame seeds, a flavoring ingredient, and water; placing the mixture into a juicer; and running the juicer to extract the safflower seed beverage from the mixture.

The advantages of the present invention are: (1) the safflower seed beverage of the present invention contains high level of ingredients in safflower seeds which has a lot of dietary and medicinal benefits; (2) the safflower seed beverage of the present invention helps in treating cancers, bone fractures, and osteoporosis; (3) the safflower seed beverage of the present invention helps in maintaining good health, losing weight, improving heart health, and maintaining healthy skin and hair; (4) the safflower seed beverage of the present invention is easy to manufacture—it can even be manufactured at home—and the manufacturing cost is very low; (5) the safflower seed beverage of the present invention is tasty and thus, easy to drink; (6) the safflower seed beverage of the present invention only contains fresh and natural ingredients of safflower seeds, black sesame seeds, carrot and water; (7) no artificial compounds are added to the safflower seed beverage of the present invention; and (8) a cold press juicer is used to have high yield of extraction from safflower seeds, black sesame seeds and carrot without destroying their nutrients.

Although the present invention is briefly summarized, the fuller understanding of the invention can be obtained by the following drawings, detailed description and appended claims.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

The safflower seed beverage of the present invention contains a safflower seed extract, a black sesame extract, at least one flavoring ingredient, and water. The safflower seed beverage is made by placing a mixture of safflower seeds, black sesame seeds, the at least one flavoring ingredient, and the water into a juicer and running the juicer to extract from the mixture the safflower seed beverage in a form of a drinkable stable emulsion. Here, "placing the mixture into the juicer" not just means all ingredients of the mixture into the juicer at the same time, but also means placing the ingredients into the juicer in any order or combination thereof while running the juicer. Preferably, the safflower seeds, black sesame seeds, and flavoring ingredient are inserted into the juicer one by one in any order to produce extracts thereof while water is pouring into the juicer to help easy extraction of the ingredients.

The juicer may be a cold press juicer or a centrifugal juicer. However, a cold press juicer is preferred because its juice yield is a lot greater and it does not destroy some of the enzymes in the fruits and vegetables being juiced. The cold press juicer has a pair of helical gears to grind the mixture, and one or more Archimedes' screws to compress the ground mixture. Among many brands of cold press juicers, Super Angel Juicer™ is recommended because its juice yield is very high.

The at least one flavoring ingredient is a vegetable or fruit and preferably, it includes carrot. The carrot and black sesame seeds are flavorful which make the safflower seed beverage tasty. Addition of the carrot is recommended since it is beneficial for digestive system allowing the beverage to be easily digested by consumers.

The mixture includes 3 to 6 weight percent of the safflower seeds; 4 to 7 weight percent of the black sesame seeds; 82 to 92 weight percent of the at least one flavoring ingredient; and 3.5 to 6 weight percent of the water.

For the optimal extracts, the mixture comprises about 3.9 weight percent of the safflower seeds; about 4.9 weight percent of the black sesame seeds; about 86.9 weight percent of the at least one flavoring ingredient; and about 4.3 weight percent of the water.

Alternatively, the mixture may comprise the safflower seeds; the black sesame seeds in an amount of about 75 to 180% by weight of the safflower seeds; the at least one flavoring ingredient in an amount of about 2,100 to 2,500% by weight of the safflower seeds; and the water. In addition, for the optimal extracts, the mixture comprise the safflower seeds; the black sesame seeds in an amount of about 126% by weight of the safflower seeds; the at least one flavoring ingredient in an amount of about 2,228% by weight of the safflower seeds; and the water in an amount of about 110% by weight of the safflower seeds.

The mixture includes no artificial compounds, and so does the safflower seed beverage. Here, the artificial compounds include artificial gum emulsifier for juice stabilizer, artificial sweetener, artificial coloring agent, and artificial preservative. Thus, the mixture and the safflower seed beverage of the present invention do not have these artificial compounds.

In the preferred embodiment of the present invention, the safflower seed beverage consists of a safflower seed extract; a black sesame extract; a flavoring ingredient; and water. The safflower seed beverage is made by placing a mixture of safflower seeds, black sesame seeds, the flavoring ingredient, and the water into a juicer and running the juicer to extract from the mixture the safflower seed beverage in a form of a drinkable stable emulsion. Preferably, the flavoring ingredient is a carrot and the mixture includes no artificial compounds. For the juicer, Super Angel Juicer™ is preferred.

The mixture may consist of the safflower seeds; the black sesame seeds in an amount of about 75 to 180% by weight of the safflower seeds; the flavoring ingredient in an amount of about 2,100 to 2,500% by weight of the safflower seeds; and the water in an amount of about 50 to 250% by weight of the safflower seeds.

To make a daily recommended dosage of the safflower seed beverage, the mixture may consist of about 7.2 ounces of the safflower seeds, about 9 ounces of the black sesame seeds, about 10 pounds of the carrot, and about 8 ounces of the water.

The process to prepare the safflower seed beverage of the present invention includes the steps of preparing a mixture of safflower seeds, black sesame seeds, a flavoring ingredient, and water; placing the mixture into a juicer; and running the juicer to extract the safflower seed beverage from the mixture. Here, the placing and running steps include not just putting all ingredients of the mixture into the juicer at the same time and running the juice, but also putting the ingredients into the juicer in any order or combination thereof while running the juicer. Preferably, the safflower seeds, black sesame seeds, and flavoring ingredient are inserted into the juicer one by one in any order to produce extracts thereof while water is pouring into the juicer to help easy extraction of the ingredients.

Preferably, the juicer is a cold press juicer which has a pair of helical gears to grind the mixture, and one or more Archimedes' screws to compress the ground mixture. Super Angel Juicer™ is recommended. Besides, the flavoring ingredient may be a carrot.

The mixture may comprise 3 to 6 weight percent of the safflower seeds; 4 to 7 weight percent of the black sesame seeds; 82 to 92 weight percent of the at least one flavoring ingredient; and 3.5 to 6 weight percent of the water.

Alternatively, the mixture may comprise the safflower seeds; the black sesame seeds in an amount of about 75 to 180% by weight of the safflower seeds; the at least one flavoring ingredient in an amount of about 2,100 to 2,500% by weight of the safflower seeds; and the water.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A process of preparing a safflower seed beverage, comprising the steps of:
   preparing a mixture of safflower seeds, black sesame seeds, a flavoring ingredient, and water;
   placing the mixture into a juicer; and
   running the juicer to extract the safflower seed beverage from the mixture,
   wherein the juicer is a cold press juicer which has a pair of helical gears to grind the mixture, and one or more Archimedes' screws to compress the ground mixture.

2. The process of preparing a safflower seed beverage of claim 1, wherein the flavoring ingredient is carrot.

3. The process of preparing a safflower seed beverage of claim 1, wherein the mixture comprises:
- 3 to 6 weight percent of safflower seeds;
- 4 to 7 weight percent of the black sesame seeds;
- 82 to 92 weight percent of the at least one flavoring ingredient; and
- 3.5 to 6 weight percent of the water.

4. The process of preparing a safflower seed beverage of claim 1, wherein the mixture comprises:
- the safflower seeds;
- the black sesame seeds in an amount of about 75 to 180% by weight of the safflower seeds;
- the at least one flavoring ingredient in an amount of about 2,100 to 2,500% by weight of the safflower seeds; and
- the water.

* * * * *